(12) United States Patent
Chen

(10) Patent No.: US 10,652,681 B2
(45) Date of Patent: May 12, 2020

(54) PROCESSING METHOD AND SYSTEM OF AUDIO MULTICHANNEL OUTPUT SPEAKER, AND MOBILE PHONE

(71) Applicant: JRD COMMUNICATION (SHENZHEN) LTD, Shenzhen, Guangdong (CN)

(72) Inventor: Qiong Chen, Guangdong (CN)

(73) Assignee: JRD COMMUNICATION (SHENZHEN) LTD, Shenzhen (CN)

( * ) Notice: Subject to any disclaimer, the term of this patent is extended or adjusted under 35 U.S.C. 154(b) by 0 days.

(21) Appl. No.: 16/312,273

(22) PCT Filed: Jul. 6, 2017

(86) PCT No.: PCT/CN2017/092055
§ 371 (c)(1),
(2) Date: Dec. 20, 2018

(87) PCT Pub. No.: WO2018/006852
PCT Pub. Date: Jan. 11, 2018

(65) Prior Publication Data
US 2019/0239011 A1 Aug. 1, 2019

(30) Foreign Application Priority Data
Jul. 6, 2016 (CN) .......................... 2016 1 0527081

(51) Int. Cl.
*H04S 3/00* (2006.01)
*H04S 1/00* (2006.01)
(Continued)

(52) U.S. Cl.
CPC ............ *H04S 1/002* (2013.01); *G10L 19/008* (2013.01); *H04M 1/03* (2013.01); *H04M 1/725* (2013.01);
(Continued)

(58) Field of Classification Search
CPC . H04S 1/002; H04S 1/007; H04S 3/00; H04S 3/008; H04S 5/00; G10L 19/008
(Continued)

(56) References Cited

U.S. PATENT DOCUMENTS 9,271,079 B2 * 2/2016 Zhang ..................... G06F 3/165
9,661,436 B2 * 5/2017 Sato ........................ H04S 3/002
(Continued)

FOREIGN PATENT DOCUMENTS

| CN | 1863300 A | 11/2006 |
|---|---|---|
| CN | 101790123 A | 7/2010 |
| CN | 104426832 A | 3/2015 |

*Primary Examiner* — Disler Paul

(57) ABSTRACT

A processing method and a processing system of an audio multichannel output speaker and a mobile phone are disclosed. The method includes: retrieving an audio and video file and establishing four channel signals for audio signals in the audio and video file with independent channel indications; performing frequency-division processing on the four channel signals respectively, and storing data of the four channel signals after frequency-division processing in order; performing digital-to-analog conversion on the data of the four channel signals respectively, and respectively sending converted analog signal data to speakers corresponding to the four channel signals one-to-one.

14 Claims, 2 Drawing Sheets

--- retrieving an audio and video file and respectively establishing four channel signals for audio signals in the audio and video file with independent channel indications — S100 performing frequency-division processing on the four channel signals respectively, and storing data of the four channel signals after frequency-division processing in order — S200 performing digital-to-analog conversion on the data of the four channel signals respectively, and respectively sending converted analog signal data to speakers corresponding to the four channel signals one-to-one — S300

(51) Int. Cl.
*G10L 19/008* (2013.01)
*H04M 1/03* (2006.01)
*H04M 1/725* (2006.01)
*H04R 5/02* (2006.01)
*H04R 3/12* (2006.01)

(52) U.S. Cl.
CPC ............... *H04S 1/007* (2013.01); *H04R 3/12* (2013.01); *H04R 5/02* (2013.01); *H04R 2420/03* (2013.01); *H04R 2499/11* (2013.01); *H04S 3/00* (2013.01); *H04S 2400/13* (2013.01)

(58) Field of Classification Search
USPC .............................. 381/1, 22–23, 17–18, 80
See application file for complete search history.

(56) References Cited

U.S. PATENT DOCUMENTS

| | | | |
|---|---|---|---|
| 2008/0130918 A1 | 6/2008 | Kimijima | |
| 2014/0086414 A1* | 3/2014 | Vilermo | H04S 3/008 381/17 |
| 2014/0161279 A1* | 6/2014 | Jones | H04R 3/12 381/97 |
| 2017/0289679 A1* | 10/2017 | Amarilio | G10L 19/012 |

* cited by examiner

PROCESSING METHOD AND SYSTEM OF AUDIO MULTICHANNEL OUTPUT SPEAKER, AND MOBILE PHONE

CROSS-REFERENCE TO RELATED APPLICATIONS

The present application is a 35 U.S.C. § 371 National Phase conversion of International (PCT) Patent Application No. PCT/CN2017/092055 filed Jul. 6, 2017, which claims foreign priority of Chinese Patent Application No. 201610527081.X, filed on Jul. 6, 2016 in the State Intellectual Property Office of China, the contents of all of which are hereby incorporated by reference.

TECHNICAL FIELD

The application relates to the field of electronic devices, and in particular, to a processing method and a processing system of an audio multichannel output speaker, and a mobile phone.

BACKGROUND

Nowadays, the integration degree of internet and electronic technologies is getting higher and higher. The intelligent and humanized requirements are also increased. The usage of mobile phones and products is becoming more and more popular, with attached functions of the mobile consumer electronics cover our living life. Multimedia is one of the most applied functions for consumer electronics, therefore how to improve user experience has become a great issue for the manufacturers. For example, the audio and video are system designs, and many manufacturers are limited by attaching better devices directly on their own product design. Such as spending more costly accessories to improve listening experience. Improving sound quality, increasing audio pitch and testing loads of indications are very complicated system engineering in the back end.

At present, the industrial design of mobile consumer electronics is getting thinner and thinner, and the requirements for speakers are getting higher as well. The ultra-thin products with small size, small power and small sound cavity design cause a great weakness of the sound quality output through the speakers, compared to the regular sound device and earphone. How to improve the output quality of the external sound has become an urgent problem to be solved.

Therefore, the related art needs to be improved and developed.

SUMMARY

In view of the above-mentioned deficiencies of the related art, an object of the present application is to provide a processing method of an audio multichannel output speaker, a processing system of an audio multichannel output speaker, and a mobile phone, which can improve the output quality of the external sound without mixing process.

The technical solution of the present application is as follows.

A processing method of an audio multichannel output speaker, includes the following operations.

A, retrieving an audio and video file and respectively establishing four channel signals for audio signals in the audio and video file with independent channel indications.

B, performing frequency-division processing on the four channel signals respectively, and storing data of the four channel signals after frequency-division processing in order.

C, performing digital-to-analog conversion on the data of the four channel signals respectively, and respectively sending converted analog signal data to speakers corresponding to the four channel signals one by one.

A processing system of an audio multichannel output speaker, includes a processor and a memory, wherein the memory is configured to store computer instructions, the processor executes the computer instructions and is configured to: retrieve an audio and video file and respectively establish four channel signals for audio signals in the audio and video file with independent channel indications; perform a frequency-division processing on the four channel signals respectively, and store data of the four channel signals after frequency-division processing in order; perform digital-to-analog conversion on the data of the four channel signals respectively, and respectively send converted analog signal data to speakers corresponding to the four channel signals one by one.

A mobile phone includes the processing system for the audio multichannel output speaker described above.

The processing method of the audio multichannel output speaker, the system of the audio multichannel output speaker, and the mobile phone provided by the present application can process each audio channel separately by using a multi-speaker design with multi-channel independent output without mixing processing. This improves the volume of the sound, and overcomes the defect of the micro-speaker, that is, the poor performance of the bass. By separately processing the audio signal, the sound field of each channel can be more effectively performed, and the details are more prominent. It can overcome the defect of the width of the sound field limited by two speakers, and can also overcome the defect of audio signal lost after sound mixing with other channels in two speakers. The present application can provide a higher loudness and sound details than the stereo output of two speakers.

DETAILED DESCRIPTION

Figure 1:
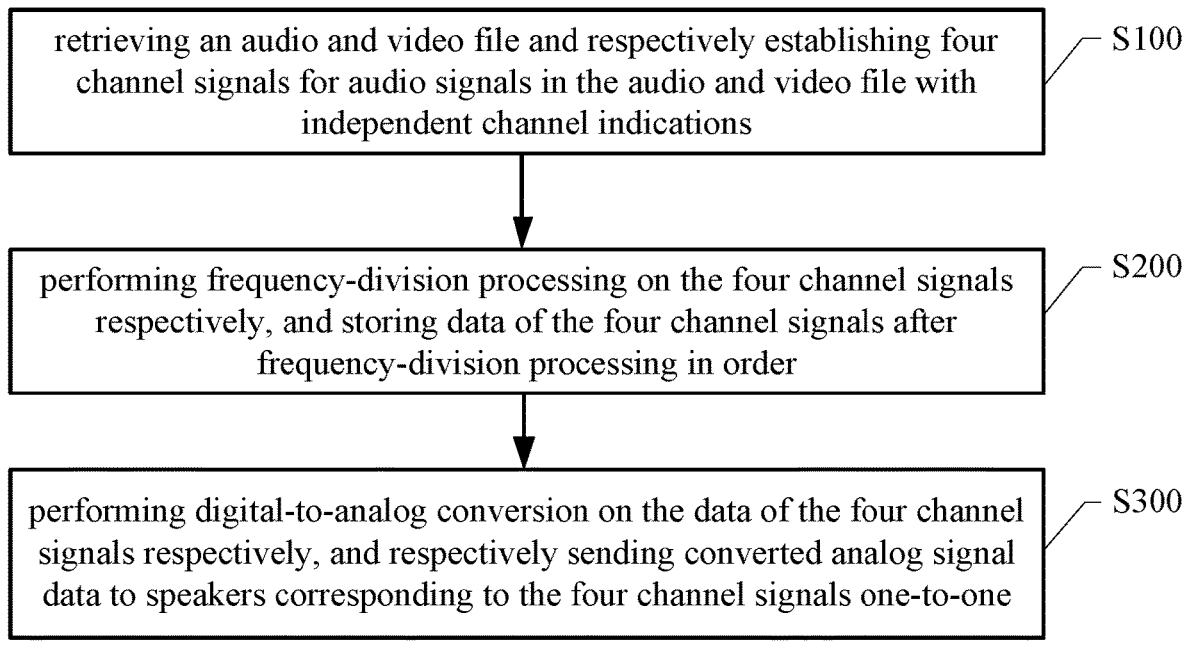
FIG. 1 is a flow chart showing a processing method of an audio multichannel output speaker in the present application.

The present application provides a processing method of an audio multichannel output speaker, a processing system of an audio multichannel output speaker, and a mobile phone. Below embodiments of the disclosure will be described in detail, examples of which are shown in the accompanying drawings, in which the same or similar reference numerals have been used throughout to denote the same or similar elements or elements serving the same or similar functions. The embodiments described below with reference to the accompanying drawings are exemplary only, meaning they are intended to be illustrative of rather than limiting the disclosure.

Please refer to FIG. 1, which is a processing method of an audio multichannel output speaker provided by the present application. The processing method includes the following operations.

S100, retrieving an audio and video file and respectively establishing four channel signals for audio signals in the audio and video file with independent channel indications.

Taking a mobile phone of the mobile terminal as an example, the ROM in the main memory of the mobile phone stores parts of the music files to be played. Audio signals in the audio and video file are separated with independence channel indications via the codec standard (such as AAC or PCM) through local audio codec algorithm managed by the mobile phone system platform. Audio tracks of left front and rear channels, and right front and rear channels are also created, and the separated audio signals include four channel signals. In the embodiment of the present application, four channel signals are taken as an example, and are corresponding to four speakers set in the phone.

S200: performing frequency-division processing on the four channel signals respectively, and storing data of the four channel signals after frequency-division processing in order.

The algorithm unit of the mobile phone processor processes the PCM data of the left and right channels transmitted from the system platform, and the algorithm unit loads a frequency dividing algorithm for processing the audio signals. This algorithm unit is similar to the coprocessor used to reduce the computational load of the main processor, thereby achieving the purpose of reducing power consumption. The video file to be played separates the audio data of the multiple channels, and sends the data back to the system platform for management, finally the data is sent to a main memory for storing. The system uniformly schedules the data and stores it in the frame buffer of the file system. The data of the left and right channels are arranged in sequence in the frame buffer to facilitate calling through the clock timing. The frame buffer after being processed needs to be sent to a hardware abstraction layer of the system platform to find and match external devices, and deploy the channel. After all the processes are completed, the codec module can be turned on.

S300: performing digital-to-analog conversion on the data of the four channel signals respectively, and respectively sending converted analog signal data to speakers corresponding to the four channel signals one-to-one.

The codec operation is started, and all I2S or SLIMBUS are set to the same clock by default to 48 KHz. Of course, it can also be set to 44.1 Hz or 192 Hz, and so on. The codec module needs to ensure that the two sets of output sampling rates are the same, the transmission data is also the same. The two sets of data are sent to the codec module number 1 and 2 via I2S (two codec modules are set for the corresponding four speakers in the mobile phone). A single codec module has multiple sets of DACs and high and low pass filters to denoise the data signals and convert the data signals into analog signals, which are later amplified by the speaker amplifier and finally output through the speakers.

The two codec modules set on the mobile phone convert two of the four channel signals from digital to analog, and output the converted signals to two speakers. The other two channel signals are then digital-analog converted and outputted to the other two speakers. The present application adopts the multichannel output frequency-division algorithm on the basis of the original stereo output signal, and additionally separates two channel signals for being outputted separately, thereby achieving the purpose of improving the external sound quality.

The present application will now be described in conjunction with specific embodiments.

A general algorithm is to input the left and right signals into an amixer of the platform for MIX, and then resample signals with the support of sampling rate of the platform to actually support the output of the stereo sound of the left and right audio channels. However, in the present application, the left and right signals are not needed to be input to the amixer for MIX. Rather, it is necessary to extract and separate the multichannel audio data in the video data by encoding and decoding through a standard such as the AAC or the PCM. The data are distinguished with different channels indications and are saved in the frame buffer of the audio flinger layer. Combined with the algorithm here, the signals of the four channels are separately processed and sent to different speakers through different speaker amplifiers for simultaneous playback. Therefore, it needs to be modified into multichannel BUFFER arrangement based on the left and right stereo dual BUFFER configurations of the android platform, from the default of one in and two out mode, into a single input and multiple output mode.

Specifically, the following operations are included.

S410, separating the audio signals in the audio and video file by audio codec algorithm via AAC standard or PCM standard with the independent channel indications, and creating audio tracks of four audio channels. The audio channels include a left front channel, a right front channel, a left rear channel, and a right rear channel.

Through the management of the mobile phone system platform, the audio signals in the audio and video file are separated by local audio codec algorithm, such as AAC standard or PCM standard with independent channel indications. The audio tracks of the left front channel and the right front channel are created, and the separated audio signals include four channel signals.

S420, retrieving the audio and video file, and dividing frequencies of the multichannel audio data in the audio and video file by an encoding and decoding standard.

For example, adopting the PCM standard to divide the frequency of the audio data. An algorithm unit loads a frequency division algorithm to process the audio signal. The PCM data of the left and right channels transmitted from the system platform is processed.

S430, distinguishing different audio channels by different channel indications, and dividing the audio channels into the left front channel, the right front channel, the left rear channel, and the right rear channel.

The left front and rear channels, and the right front and rear channels are used to distinguish the processed data transmitted corresponding to the speakers.

S440, applying and create four frame buffers in an audio flinger layer.

When saving the four channel signals, it is necessary to apply four frame buffers on the main memory, and then save the four channel signals in the four frame buffers.

S450, respectively storing the channel signals of the left front channel, the right front channel, the left rear channel, and the right rear channel in the frame buffers of the audio flinger layer in clock sequence.

The data of the left front and rear channels, and the right front and rear channels saved in the clock order is convenient to be uniformly scheduled for the system, for example, to schedule by clock sequence.

S460, respectively allocating the four channel signals to different codecs for performing digital-to-analog conversion in clock sequence.

Codec is a multimedia digital signal codec that is responsible for digital to analog signal conversion (DAC) and analog to digital signal conversion (ADC). Whether the audio accelerator or the I/O controller, their input and output are pure digital signals, and the signals must be converted by the codec on a sound card. The analog input and output quality has a significant relationship with the conversion quality of the codec module. The audio accelerator or the I/O controller determines the quality of the internal digital signal, while the codec determines the quality of the analog input and output. Currently a codec module supports stereo output of up to two speakers. Therefore, when implementing the functionality of this application, two codec modules are needed. The two codec modules are respectively connected to the baseband processor module through the I2S bus, and signals of the two paths are transmitted to the two codec modules respectively.

The present application has two codec modules, the codec module of number 1 is as an external device that being used to convert the audio signal from a digital signal to an analog signal. Since two or more digital-to-analog converters are provided, the audio signals in channel 1 and channel 2 are transmitted to speaker number 1 and speaker number 2 respectively. The codec module of number 2 is as an external device that being used to convert the audio signal from a digital signal to an analog signal. Since two or more digital-to-analog converters are provided, the audio signal of channel 3 and the audio signal of channel saved in the frame buffer by time sequence are transmitted to speaker number 3 and speaker number 4 respectively.

Figure 2:
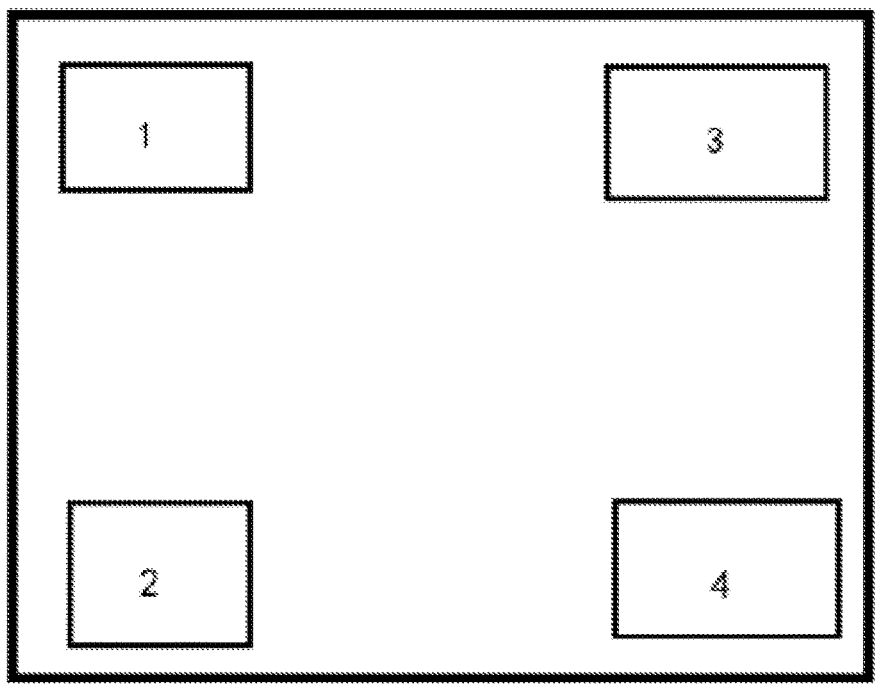
FIG. 2 is a schematic view showing a horizontal placement of speakers according to the processing method of the audio multichannel output speaker in the present application.

Please refer to FIG. 2, the present application is provided with four speakers. From the figure, we can know that when the speakers are vertical displayed, a distance between the main audio output sound holes of the speaker number 2 and speaker number 4 is very close, only about a few centimeters. If these two speakers are set as main speakers for playing the audio signals of the left front channel and the left rear channel, while the speaker number 1 and speaker number 3 broadcasting the sound of the right front channel and the right rear channel, the sound is effective only when the user approaching a front side where approximately a few centimeters away from the center of two speakers. For the user, there is no such extreme operating habit. Therefore, it is much better to arrange the speaker number 2 and the speaker number 1 as the output sound of left front channel and left rear channel, and arrange the speaker number 3 and the speaker number 4 as the output sound of right front channel and right rear channel. Since more than 20 cm is a relatively customary distance for the user to the product, the position of the speakers needs to be calculated by a formula. If the device is larger in size, the speaker number 1 and speaker number 2 can also be used as the main speakers. Taking a 5.5-inch mobile phone as an example, speaker number 1 and number 2 can be selected for outputting the audio signals of the left front and rear channels. Similarly, speaker number 4 and speaker number 3 can be selected for outputting the audio signals of the right front and right rear channels. The cavity design of the four speakers preferably has the same size. The devices are kept to be consistent. Two sets of the four speakers are respectively connected to the codec module number 1 and number 2.

S470, respectively sending the converted analog signal data to the speakers corresponding to the four channel signals one-to-one.

It can be understood from the above description that the ROM in the main memory of the mobile phone stores part of the audio and video file to be played, and the multichannel audio signals in the audio and video file are separated by the local audio decoding algorithm through the management of the system platform. The audio tracks of the left front and rear channels and the right front and rear channels are created. Then, the four channel signals of the left front and rear channels and the right front and rear channels are respectively sent to the algorithm unit for distribution processing, and sent back to the system platform. The signals are uniformly dispatched and saved to the four frame buffers in the file system by the system platform, which is convenience for respectively sending the signals to the codec modules through the clock sequence of I2S. The frame buffer is first initialized during processing to prepare for saving the frequency-divided signals, and the audio signals of the left and right channels are sent to the processing unit for frequency division. The codec module performs digital-to-analog conversion to the signal and sends it to the speakers.

Figure 3:
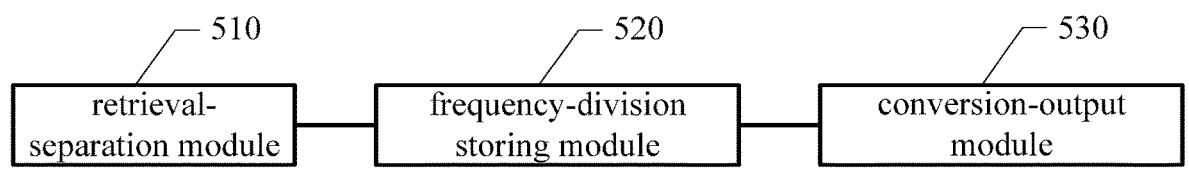
FIG. 3 is a block diagram of a processing system of an audio multichannel output speaker of the present application.

According to the above processing method, the present application further provides a processing system of an audio multichannel output speaker, as shown in FIG. 3, which includes: a retrieval-separation module 510, configured to retrieve an audio and video file, and respectively establish four channel signals for audio signals in the audio and video file with independent channel indications, specifically as described above; a frequency-division storing module 520, configured to perform frequency-division processing on the four channel signals respectively, and store data of the four channel signals after frequency-division processing in order, specifically as described above; a conversion-output module 530, configured to perform digital-to-analog conversion on the data of the four channel signals respectively, and respectively send converted analog signal data to speakers corresponding to the four channel signals one-to-one.

The retrieval-separation module 510 includes a separation unit, configured to separate the audio signals in the audio and video file by audio codec algorithm via AAC standard or PCM standard under the independent channel indications, and create four audio tracks of audio channels. The audio channels includes a left front channel, a right front channel, a left rear channel, and a right rear channel, specifically as described above.

The frequency-division storing module 520 includes: a frequency dividing unit, for retrieving the audio and video file, and dividing frequencies of the multichannel audio data in the audio and video file by an encoding and decoding standard, specifically as described above; an indication unit, for distinguishing different audio channels by different channel indications, and dividing the audio channels into a left front channel, a right front channel, a left rear channel, and a right rear channel, specifically as described above; an applying storage unit, for applying and create four frame buffers in an audio flinger layer, specifically as described above; a storage unit, for respectively storing the channel signals of the left front channel, the right front channel, the left rear channel, and the right rear channel in the frame buffers of the audio flinger layer in clock sequence.

The conversion-output module 530 includes: a conversion unit, configured to respectively allocate the four channel signals to different codecs for performing digital-to-analog conversion in clock sequence, specifically as described above.; an output unit, configured to respectively send the converted analog signal data to the speakers corresponding to the four channel signals.

The present application also provides a processing system of an audio multichannel output speaker. The processing system includes a processor and a memory. The memory is configured to store computer instructions. The processor executes the computer instructions and is configured to execute the above method embodiments or the modules and units in the processing systems as shown in FIG. 3.

The present application also provides a mobile phone including the above described processing system of audio multichannel output speaker.

In summary, the processing system of an audio multichannel output speaker, the processing method of an audio multichannel output speaker, and the mobile phone provided by the present application use a multi-speaker design, and multiple independent outputs. By independently processing each audio channel without mixing, it can not only improve the audio volume, but also overcome the defects of the micro-speakers, that is, a poor bass performance. By separately processing the audio signal, the sound field of each audio channel can be more effectively performed, the details are also more prominent. It can overcome the defect of the width of the sound field limited by two speakers, and can also overcome the defect of audio signal lost after sound mixing with other channels in two speakers. The present application can provide a higher loudness and sound details than the stereo output of two speakers.

It could be understood that, one skilled in the art may make any equivalence or modification based on the technical solution and the inventive concept of the present disclosure. All these modifications and equivalences shall all be covered within the protection claimed in the claims of the present disclosure.

What is claimed is:

1. A mobile phone with a processing system of an audio multichannel output speaker, comprising a processor and a memory, wherein the memory is configured to store computer instructions, the processor executes the computer instructions and is configured to:
   retrieve an audio and video file, and respectively establish four channel signals for audio signals in the audio and video file with independent channel indications;
   perform a frequency-division processing on the four channel signals respectively, and store data of the four channel signals after frequency-division processing in order; and
   perform a digital-to-analog conversion on the data of the four channel signals respectively, and respectively send converted analog signal data to speakers corresponding to the four channel signals one-to-one;
   wherein the processor is further configured to separate the audio signals in the audio and video file by audio codec algorithm via AAC standard or PCM standard with the independent channel indications, and create audio tracks of four audio channels; the audio channels comprising a left front channel, a right front channel, a left rear channel, and a right rear channel; and
   wherein the processor is further configured to respectively allocate the four channel signals to different codecs for performing digital-to-analog conversion in clock sequence, and respectively send the converted analog signal data to the speakers corresponding to the four channel signals one-to-one.

2. The mobile phone according to claim 1, wherein the processor is further configured to:
   retrieve the audio and video file, and divide frequencies of multichannel audio data in the audio and video file by an encoding and decoding standard;
   distinguish different audio channels by different channel indications, and divide the audio channels into a left front channel, a right front channel, a left rear channel, and a right rear channel;
   apply and create four frame buffers in an audio flinger layer; and
   respectively store the channel signals of the left front channel, the right front channel, the left rear channel, and the right rear channel in the frame buffers of the audio flinger layer in clock sequence.

3. The mobile phone according to claim 2, wherein the processor is further configured to:
   load a frequency division algorithm for processing the audio signals.

4. A processing method of an audio multichannel output speaker, comprising:
   A, retrieving an audio and video file and respectively establishing four channel signals for audio signals in the audio and video file with independent channel indications;
   B, performing frequency-division processing on the four channel signals respectively, and storing data of the four channel signals after frequency-division processing in order; and
   C, performing digital-to-analog conversion on the data of the four channel signals respectively, and respectively sending converted analog signal data to speakers corresponding to the four channel signals one-to-one;
   wherein the operation A specifically comprises:
   separating the audio signals in the audio and video file by an audio codec algorithm via AAC standard or PCM standard with the independent channel indications, and creating audio tracks of four audio channels;
   wherein the audio channels comprise a left front channel, a right front channel, a left rear channel, and a right rear channel;
   wherein the operation C specifically comprises:
   C1, respectively allocating the four channel signals to different codecs for performing digital-to-analog conversion in clock sequence; and
   C2, respectively sending converted analog signal data to the speakers corresponding to the four channel signals one-to-one.

5. The processing method of an audio multichannel output speaker according to claim 4, wherein the operation B specifically comprises:
   B1, retrieving the audio and video file, and dividing frequencies of the multichannel audio data in the audio and video file by an encoding and decoding standard; and
   B2, distinguishing different audio channels by different channel indications, and dividing the audio channels into a left front channel, a right front channel, a left rear channel, and a right rear channel.

6. The processing method of an audio multichannel output speaker according to claim 5, wherein the operation B1 specifically comprises:
   retrieving the audio and video file, loading a frequency division algorithm for processing the audio signals via an algorithm unit, and dividing the frequencies of the multichannel audio data in the audio and video file by the encoding and decoding standard.

7. The processing method of an audio multichannel output speaker according to claim 4, wherein the operation B specifically comprises:
   B3, applying and creating four frame buffers in an audio flinger layer; and B4, respectively storing the channel signals of the left front channel, the right front channel, the left rear channel, and the right rear channel in the frame buffers of the audio flinger layer in clock sequence.

8. The processing method of an audio multichannel output speaker according to claim 7, wherein the operation B4 specifically comprises:
sending the processed frame buffers to a hardware abstraction layer of a system platform for finding and matching external devices, and deploying the channels.

9. The processing method of an audio multichannel output speaker according to claim 4, wherein the operation C1 specifically comprises:
dividing the four channel signals into two path signals in clock sequence, and sending the two path signals to two codec modules for digital-to-analog conversion.

10. A processing system of an audio multichannel output speaker, comprising a processor and a memory, wherein the memory is configured to store computer instructions, the processor executes the computer instructions and is configured to:
retrieve audio and video file and establish four channel signals for audio signals in the audio and video file with independent channel indications;
perform frequency-division processing on the four channel signals respectively, and store data of the four channel signals after frequency-division processing in order; and
perform digital-to-analog conversion on the data of the four channel signals respectively, and respectively sending converted analog signal data to speakers corresponding to the four channel signals one-to-one;
wherein retrieving audio and video file and establishing four channel signals for audio signals in the audio and video file with independent channel indications specifically comprises:
separating the audio signals in the audio and video file by an audio codec algorithm via AAC standard or PCM standard with the independent channel indications, and creating audio tracks of four audio channels;
wherein the audio channels comprising a left front channel, a right front channel, a left rear channel, and a right rear channel;
wherein performing digital-to-analog conversion on the data of the four channel signals respectively, and respectively sending converted analog signal data to speakers corresponding to the four channel signals specifically comprises:
respectively allocating the four channel signals to different codecs for performing digital-to-analog conversion in clock sequence; and
respectively sending converted analog signal data to the speakers corresponding to the four channel signals one-to-one.

11. The processing system of an audio multichannel output speaker according to claim 10, wherein performing frequency-division processing on the four channel signals respectively, and storing data of the four channel signals after frequency-division processing in order specifically comprises:
retrieving the audio and video file, and dividing frequencies of the multichannel audio data in the audio and video file by an encoding and decoding standard; and
distinguishing different audio channels by different channel indications, and dividing the audio channels into a left front channel, a right front channel, a left rear channel, and a right rear channel.

12. The processing system of an audio multi-channel output speaker according to claim 11, wherein the processor is further configured to:
load a frequency division algorithm for processing the audio signals via an algorithm unit.

13. The processing system of an audio multi-channel output speaker according to claim 10, wherein the processor is further configured to:
apply and create four frame buffers in an audio flinger layer; and
respectively store the channel signals of a left front channel, a right front channel, a left rear channel, and a right rear channel in the frame buffers of the audio flinger layer in clock sequence.

14. The processing system of an audio multi-channel output speaker according to claim 10, wherein respectively allocating the four channel signals to different codecs for performing digital-to-analog conversion in clock sequence specifically comprises:
dividing the four channel signals into two path signals in clock sequence, and sending the two path signals to two codec modules for digital-to-analog conversion.

* * * * *